Figure 2A:
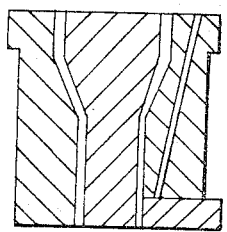
Figure 2B:
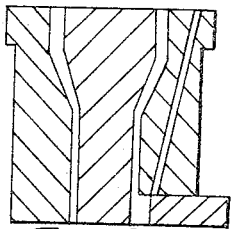
Figure 2C:
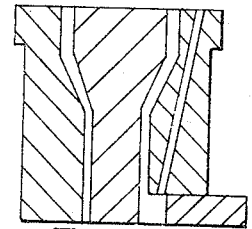

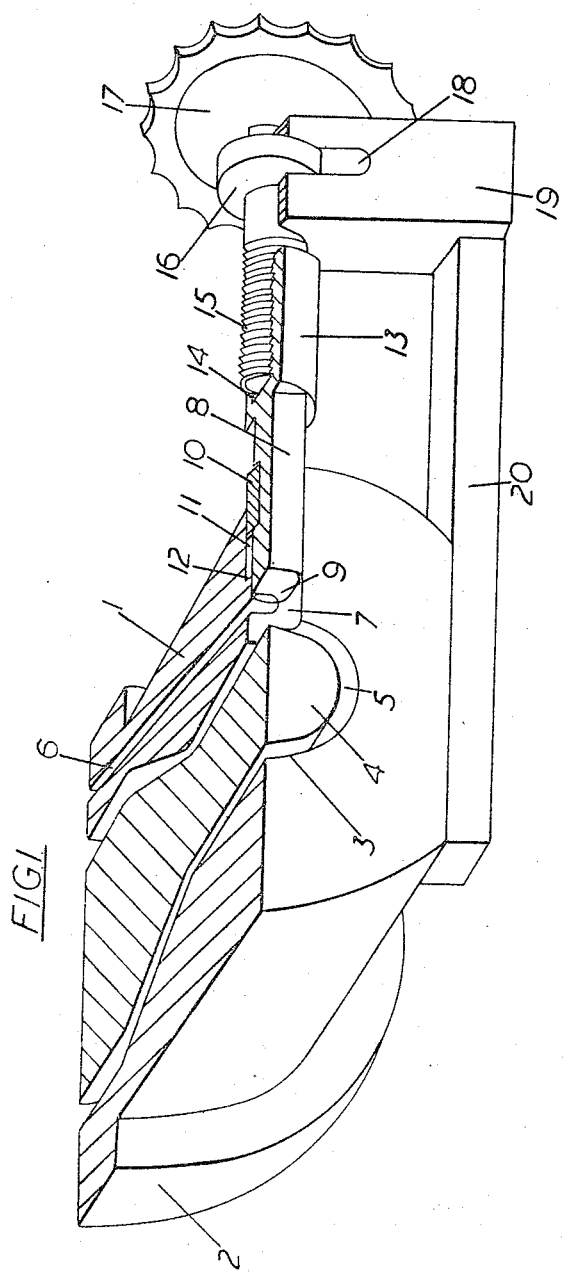

United States Patent Office 3,346,918
Patented Oct. 17, 1967

3,346,918
EXTRUSION DIE
Antoine Deleuze, Lyon, and Roger Georges Louis Gulling, Saint-Fons, France., assignors to Rhone-Poulenc S.A., Paris, France, a corporation of France
Filed Oct. 14, 1965, Ser. No. 495,908
Claims priority, application France, Dec. 7, 1964, 997,684
2 Claims. (Cl. 18—12)

The present invention concerns an extrusion die having a variable orifice, permitting the formation on the extruded articles of thickened portions the height and length of which may vary optionally during the course of extrusion.

Many articles, owing to their shape or for the purpose of reinforcing their mechanical properties, require to be formed, when being produced, with projections or thickened portions which may extend over the entire periphery of the shaped article, or may be limited only to a portion of their periphery or their length. In order to produce such articles by extrusion of a plastic material, many solutions have been proposed for permitting the formation of projections during the course of extrusion. Where the projection concerns only a portion of the perimeter of the article, it has been proposed for example to machine the extrusion die in accordance with the desired profile. In addition to the fact that the machining of such a die is very expensive, this arrangement has the disadvantage that the projection produced is continuous over the entire length of the extruded article. Therefore, subsequent machining of the article is necessary in order to eliminate parts of the said projection where appropriate.

For the production of hollow articles, it has also been proposed to associate with the machining of the die a machining of the ram, or to give the latter a position in the die such that it causes the formation of a difference in thickness between the walls of the extruded article. In these cases also, the modification affects the entire length of the article.

For extrusion of hollow articles, a die has also been proposed whose orifice cross-section can be modified during the course of extrusion. This device, as described in the French Patent 1,330,757 filed on April 6, 1962, proposes the displacement in the direction of extrusion of a mobile ram the end of which is frusto-conical in form and of a diameter increasing in the direction of extrusion. The displacement of the frusto-conical portion modifies the opening of the orifice during the course of extrusion. However, this modification affects the entire perimeter of the orifice, and this produces, on the extruded article, an annular variation of the thickness of the walls which can only be controlled in the longitudinal sense. Moreover, such a device can only be used for the moulding of hollow articles.

According to the present invention there is provided an extrusion die having an extrusion orifice therein at least one chamber opening into the extrusion face of said die and into the extrusion orifice, a movable piston in each said chamber producing, when it is displaced, a modification in the total cross-section of the extrusion orifice and chamber at the point where they open into the extrusion face.

The orifice may be cylindrical to obtain round shapes, annular to produce hollow objects, slot-shaped, or may be L-shaped or U-shaped, etc. The dimensions of the die and its orifice, of course, depend on the article to be produced.

The chamber may extend from the extrusion orifice over the entire width of the die wall or it may be limited to only a portion of the said wall. Its length will then be determined in dependence on the length of the piston, and the maximum displacement travel thereof. Its width in the plane of the front face of the die depends on the width desired for the projection. Its cross-section may be of any shape. In order to facilitate production, it is preferable, however, to give it a square, rectangular or semi-circular cross-section. The depth of the chamber relative to the front face of the die is not critical, and may be between several millimetres and several centimetres. At all events, it may be chosen with a view to machining facility for the chamber and for the piston. The shape and dimensions of the piston depend on those of the chamber. The end of the piston which comes into contact with the extrusion orifice in the normal position, so as not to modify the extruded article in any way in this position.

When the piston is semi-cylindrical in form, it is held against rotation by appropriate means e.g. a key and keyway.

The length of the displacement of the piston in its housing depends on the height which the projection is to be given. Displacement may be effected by any suitable system such as an electrical, pneumatic or hydraulic device. Such a system may be subjected to a device controlling the initiations, the travel, the stopping and the return of the piston, in dependence on a working cycle determined by certain parameters (position of the projection on the article, length of the projection, height of the projection, frequency with which it occurs etc.)

When the piston is displaced into its housing, the plastics material spreads itself out in the passage thus freed under the effect of the component of pressure normal to its displacement. However, beyond a given displacement of the piston, the deformation characteristics of the plastics material do not permit complete filling of the chamber. It is then necessary to increase the rate of flow of material at the place where the projection is provided. This may be effected by feeding material through a material supply duct which opens into the chamber and is either closed or unmasked by the said piston in certain specific positions determined by the quantity of material required for providing a projection of given dimensions. The supply duct is preferably cylindrical. It may also be given the form of a slot the length of which is equal to the width of the piston. Its cross-section depends on the quantity of material to be delivered into the space created by the withdrawal of the piston. The supply duct can begin at any desired point on the path of travel of the material, for example, it may begin in the die itself or it may be connected to a duct coming from the extrusion press through the extrusion head. It may also be connected to a duct supplied by a second extrusion press with a material of different colour, which makes it possible to obtain coloured effects on the article produced.

It is possible to provide several mobile pistons on the front face of the die. These pistons may be given different characteristics and may operate simultaneously or otherwise.

In the case of a die intended to produce hollow articles, the mobile piston can be disposed on the front face of the die and/or in the ram, which makes it possible to obtain projections within the hollow article.

The die according to the invention is particularly suitable for the extrusion of preforms which are intended for the moulding of articles of complicated shape by a blow-die method or under a vacuum. It is known that when moulding such articles some parts of the walls of the preform are subjected to considerable stretching effects which considerably reduce the thickness of these parts. In order to overcome this disadvantage, a local thickening of the walls of the preform must be produced at the level of the parts which are to be subjected to the greatest stress.

The die according to the invention is particularly suitable for the production of such preforms.

Figure 3A:
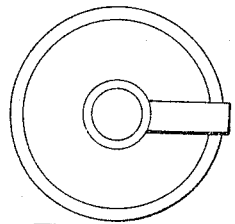
Figure 4A:
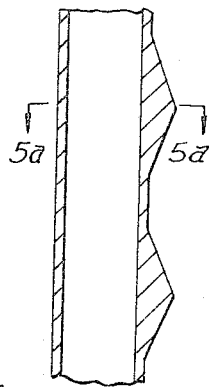
Figure 4B:
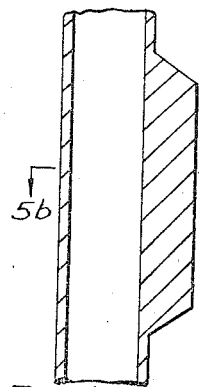
Figure 4C:
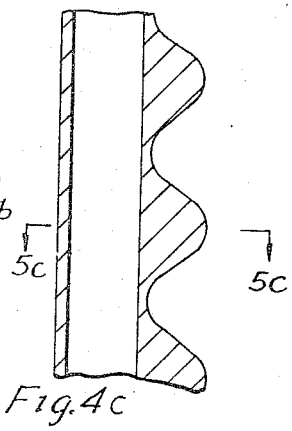
Figure 5A:
Figure 5B:
Figure 5C:
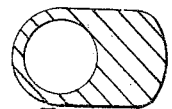

The invention will become more readily understood from the following description given, by way of example, with reference to the accompanying drawings wherein:

FIGURE 1 is a perspective sectional view through a die for the extrusion of hollow articles;

FIGURES 2a, b, c are fragmentary, schematic, sectional, side elevations of the die of FIGURE 1, showing three different positions of the movable piston;

FIGURES 3a, b, c are underneath plan views of the die of FIGURE 1, showing the piston in the positions corresponding to FIGURES 2a, b and c respectively;

FIGURES 4a, b, c show three different examples of shapes of article which may be obtained with the device shown in FIGURE 1;

FIGURES 5a, b, c show cross-sectional views of tubular articles whose projections have been produced by means of dies similar to those shown in FIGURE 1, but wherein chambers in each case are of different width.

In FIGURE 1, the die comprises a die body 1 fixed on the extrusion head of the extrusion press (not shown), by any suitable means, level with a shoulder 2. The body 1 has a bore 3, in which there is situated a ram 4 which defines with the walls of the bore, an annular extrusion orifice 5. A material supply duct 6 extends through the die body over the entire length thereof, and is adapted to be connected to a duct machined in the extrusion head. The duct 6 terminates in a semi-cylindrical chamber 7 formed in the front face of the die, and extending through this face from the bore 3 over the entire width of the said face. A mobile piston 8 which is also semi-cylindrical in shape is adapted to slide in the chamber 7, the end 9 of the piston 8 being machined in such a manner as to match the outline of the bore 3 in the normal position. In this position no thickened portion is formed on the extruded article. To prevent the piston 8 from rotating a key 10 is provided which is slidable in a groove 11. The key 10 is fixed on the piston in such a position as to prevent the piston from moving axially beyond the normal extrusion position by abutting on the end 12 of the groove 11.

The piston 8 also includes a cylindrical portion 13 the diameter of which is greater than that of the remainder of the piston. An internally screwthreaded bore 14 formed in the portion 13 co-operates with a screwthreaded rod 15, provided with a bearing portion 16 and associated with a sprocket 17. The rod 15 is held against axial displacement by its bearing portion 16 being situated in a housing 18 formed in a support 19 secured to the die by means of two struts 20.

The sprocket 17 is rotated by means of a reversible electric motor and by a chain (not shown). When the sprocket wheel is rotated and rotates the screwthreaded rod, it causes the piston 8 to be subjected to rectilinear displacement. When the direction of rotation of the motor is reversed, the direction of displacement of the piston is similarly reversed. The assembly constituted by cylindrical body, screwthreaded rod, support and sprocket can be replaced, if desired, by a pneumatic or hydraulic driving device.

Figure 3B:
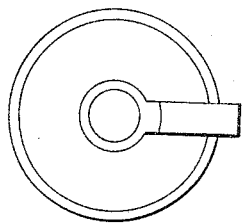
Figure 3C:
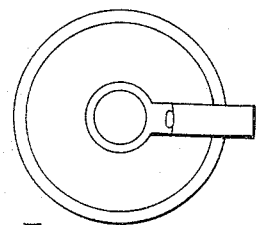

Three positions of the piston are illustrated in FIGURES 2a, b and c. In FIGURE 2a the piston is in the normal position, the die then having the shape illustrated in FIGURE 3a. When the motor rotates, the sprocket causes the displacement of the piston into a position 2b which gives the die the shape illustrated in FIGURE 3b. A more marked withdrawal of the piston to the position 2c unmasks the orifice of the duct 6 and the die is then given the shape 3c shown in FIGURE 3.

FIGURES 4a, b and c illustrate longitudinal sectional views through hollow articles which may be formed with apparatus according to the invention and provided with projections. The configuration of these projections has been obtained by modifying the direction and speed of displacement of the piston 8 or stopping it in a given position during extrusion.

The device according to the invention makes it possible to provide projections the thickness of which varies during the course of extrusion in accordance with a design which is dependent on the direction of the displacement of the piston and/or the speed of the said displacement. It is also possible to vary the length of the projection by returning the piston to the normal position. The combination of two or more pistons makes it possible to obtain thickened portions of desired height at desired places. Where the tube extruded is to be used for forming a hollow article by blow-moulding, the die according to the invention makes it possible to reinforce only the zones of the preform which will be subjected to intense stretching, achieving a saving in raw material.

We claim:

1. In a machine for extrusion of a profile of a variable section, an extrusion die comprising a body having a bore passing therethrough and terminating at an end face, said body defining a major portion of an extrusion orifice of said die at said end face, at least one chamber formed in the end face of said body with the inner end of said chamber opening into said extrusion orifice. each said chamber extending transversely of said extrusion orifice, at least ber opening into said extrusion orifice, each said chamber and defining the remainder of said extrusion orifice, and means for displacing said piston in said chamber with respect to the inner end thereof to thereby change the dimensions and cross section of the extrusion orifice.

2. The extrusion die as specified in claim 1, wherein supplementary supply duct means are formed in said body opening into each said chamber at a point spaced from said extrusion orifice, said duct being opened to said chamber by said piston as it moves away from the inner end of said chamber.

References Cited

UNITED STATES PATENTS

| 1,585,149 | 5/1926 | Humphrey. | |
| 3,002,615 | 10/1961 | Lemelson. | |
| 3,143,583 | 8/1964 | Haugwitz | 18—13 X |
| 3,221,371 | 12/1965 | Stevens | 18—14 |
| 3,222,722 | 12/1965 | Reifenhauser | 18—13 X |

WILLIAM J. STEPHENSON, *Primary Examiner.*